United States Patent
Gay Sam et al.

(10) Patent No.: US 7,046,463 B2
(45) Date of Patent: May 16, 2006

(54) LOW FLYING HEAD DETECTION USING READBACK SIGNAL AMPLITUDE MODULATION

(75) Inventors: Alfredo Gay Sam, Oklahoma City, OK (US); Housan Dakroub, Oklahoma City, OK (US); Ghassan M. Abdelnour, Oklahoma City, OK (US); Jeffrey A. Heydt, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 258 days.

(21) Appl. No.: 10/268,343

(22) Filed: Oct. 9, 2002

(65) Prior Publication Data

US 2003/0184899 A1   Oct. 2, 2003

Related U.S. Application Data

(60) Provisional application No. 60/368,361, filed on Mar. 28, 2002.

(51) Int. Cl.
*G11B 5/02* (2006.01)
*G11B 27/36* (2006.01)
*G11B 21/02* (2006.01)

(52) U.S. Cl. .......................... 360/25; 360/31; 360/75
(58) Field of Classification Search ............ 360/73.01, 360/73.03, 75
See application file for complete search history.

(56) References Cited

U.S. PATENT DOCUMENTS 4,777,544 A * 10/1988 Brown et al. ................ 360/75
5,377,058 A    12/1994 Good et al.
5,377,131 A    12/1994 Ottesen et al.
5,410,439 A     4/1995 Egbert et al.
5,454,157 A *  10/1995 Ananth et al. ............ 29/603.03
5,825,581 A *  10/1998 Morita et al. ............. 360/78.04
5,909,330 A *   6/1999 Carlson et al. ................ 360/31
6,046,596 A     4/2000 Schaenzer et al.
6,249,393 B1    6/2001 Billings et al.
6,483,657 B1 * 11/2002 Fioravanti et al. ............ 360/75
6,587,301 B1 *  7/2003 Smith ........................ 360/75
6,762,899 B1 *  7/2004 Ottesen et al. ................ 360/75
2001/0013985 A1  8/2001 Baba et al.
2001/0035960 A1 11/2001 Johnston
2001/0046108 A1 11/2001 Lewis et al.

* cited by examiner

*Primary Examiner*—David Hudspeth
*Assistant Examiner*—Daniell L. Negrón
(74) *Attorney, Agent, or Firm*—Fellers, Snider, et al.

(57) ABSTRACT

A method for determining whether a data storage device read/write head is a low-flying read/write head or a non low-flying read/write head. A disc attached to a spindle motor is accelerated to an operating rotational velocity, the head is positioned over a portion of the disc non-accessible to customer data and a data pattern of selected frequency is written. A magnetoresistive element of the is biased and the data pattern is read while the disc is decelerated to a predetermined rotational velocity threshold. Occurrence of a read signal landing signature comprising readback signal amplitude modulation prior to reaching the predetermined rotational velocity threshold identifies the head as a low-flying head. Contrawise, non-occurrence of the read signal landing signature prior to reaching the predetermined rotational velocity threshold signifies the head as a non low-flying head.

13 Claims, 4 Drawing Sheets

LOW FLYING HEAD DETECTION USING READBACK SIGNAL AMPLITUDE MODULATION

RELATED APPLICATIONS

This application claims priority to U.S. Provisional Application No. 60/368,361 filed Mar. 28, 2002, entitled Detecting Head Fly Height Using Motor Spin Down.

FIELD OF THE INVENTION

This invention relates generally to the field of magnetic data storage devices, and more particularly, but not by way of limitation, to identifying a low flying read/write head of a disc drive based on a read signal landing signature response.

BACKGROUND

Disc drives are used for data storage in modern electronic products ranging from digital cameras to computers and network systems. Typically a disc drive includes a mechanical portion and an electronics portion in the form of a printed circuit board assembly that controls functions of the mechanical portion while providing a communication interface to a host being serviced by the disc drive.

Typically, the mechanical portion, or head-disc assembly, has a disc with a recording surface rotated at a constant speed by a spindle motor assembly and an actuator assembly positionably controlled by a closed loop servo system for use in accessing the stored data. The actuator assembly commonly supports a magnetoresistive read/write head that writes data to and reads data from the recording surface. Normally, the magnetoresistive read/write head uses an inductive element, or writer, to write data to and a magnetoresistive element, or reader, to read data from the recording surface.

The disc drive market continues to place pressure on the industry for disc drives with increased capacities, higher data rates and lower costs. A key aspect of achieving lower costs is an identification of marginal components as early as practical in the manufacturing process to preclude needless accrual of additional manufacturing costs and costly rework operations in subsequent processes. Additionally, an ability to identify, remove and replace marginal components from a disc drive prior to shipment is an aid in reduction of field failure and warranty expense.

A critical component of a disc drive is the magnetoresistive read/write head. As each read/write head passes through manufacturing processes in preparation for use in a disc drive, costs associated with those processes accrue and contribute to the overall cost of the disc drive. By measuring characteristics of the read/write head throughout the manufacturing process, defective and marginal read/write heads can be culled from the process before additional costs are needlessly applied.

Fly height of a read/write head is an important operating characteristic of the read/write head for proper operation of the disc drive. A read/write head with a fly height greater than a specified nominal fly height will typically display poor data transfer characteristics and is generally replaced. However, a read/write head with a fly height less than the specified nominal fly height will typically display good data transfer characteristics and, unless detected, is generally not replaced. An undetected low-fly head within a disc drive poses an increased risk to subsequent failure of the disc drive over the useful life of the disc drive.

As such, challenges remain and a need persists for effective techniques for determining a low-flying read/write head within a disc drive throughout the disc drive manufacturing process. It is to this and other features and advantages set forth herein that embodiments of the present invention are directed.

SUMMARY OF THE INVENTION

As exemplified herein, embodiments of the present invention are directed to categorization of a fly height status of a read/write head relative to a disc of a disc drive as either a low-flying read/write head or as a non low-flying read/write head.

Categorization of the fly height status of the read/write head is based on detection of a read signal landing signature prior to encountering a predetermined rotational velocity threshold. The read signal landing signature is preferably determined from a readback of a constant frequency pattern written to a region of the disc inaccessible for storage of customer data.

During a landing procedure, the readback of the constant frequency pattern is monitored while the disc decelerates from a nominal operating rotational velocity to a stationary state. While decelerating the disc, the read signal landing signature is formed just prior to the read/write head landing on the disc.

Occurrence of said read signal landing signature while the rotational velocity of the disc is greater than the predetermined rotational velocity threshold indicates the presence of a low-flying read/write head.

These and various other features and advantages, which characterize the present invention, will be apparent from a reading of the following detailed description and a review of the associated drawings.

DETAILED DESCRIPTION

Figure 1:
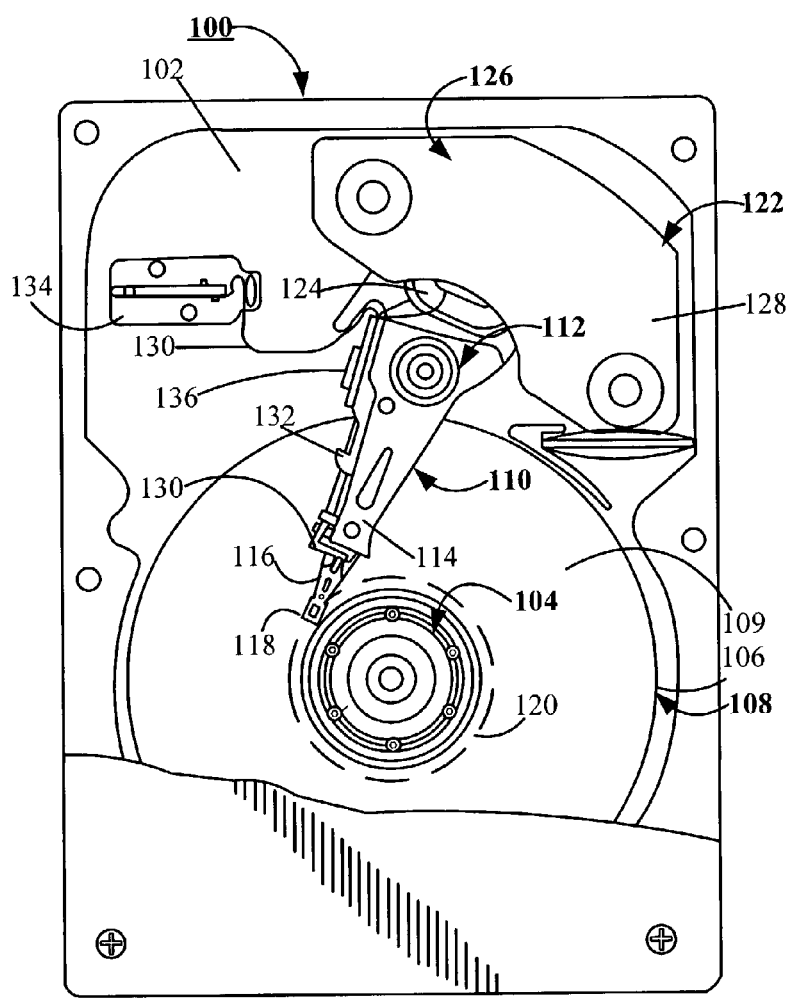
FIG. 1 is a top plan view of a disc drive that incorporates a read/write head screened for low-fly height.

FIG. 1 shows a top view of a disc drive data storage device 100 constructed in accordance with preferred embodiments of the present invention. The disc drive 100 includes a basedeck 102 supporting various data storage device components including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The recording surface 109 is divided into concentric information tracks 120 (only one depicted) over which the read/write head 118 is positionably located. The information tracks 120 accommodate head position control information written to embedded servo sectors (not separately depicted).

Between the embedded servo sectors are data sectors used for storing data in the form of bit patterns. The read/write head 118 includes a reader element (not separately shown) offset radially and laterally from a writer element (not separately shown). The writer element writes data to the concentric information tracks 120 while the reader element controls the positioning of the read/write head 118 relative to the concentric information tracks 120 during write operations. During read operations the reader element reads data from the concentric information tracks 120 for passage to a host (not shown) serviced by the disc drive 100 and for use by a servo control system.

The term "servoing," or "position-controlling," as used herein, means maintaining control of the read/write head 118 relative to the rotating recording surface 109 during operation of the disc drive 100. When servoing to or servoing on a selected information track 120, the actuator assembly 110 is controllably positioned by a voice coil motor assembly 122. The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122.

During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surface 109.

To provide the requisite electrical conduction paths between the read/write head 118 and read/write circuitry of the disc drive (not shown), read/write head wires (not shown) affixed to the read/write head 118 are attached to a read/write flex circuit 130. The read/write flex circuit 130 is routed from the load arm 116 along the actuator arm 114 and into a flex circuit containment channel 132 and secured to a flex connector body 134.

The flex connector body 134 supports the flex circuit 130 during passage through the basedeck 102 and into electrical communication with a printed circuit board assembly (PCBA), (not shown) typically mounted to the underside of the basedeck 102.

The flex circuit containment channel 132 also supports read/write signal circuitry including a preamplifier/driver (preamp) 136 that conditions read/write signals passed between the read/write circuitry and the read/write head 118. The printed circuit board assembly mounted to the underside of basedeck 102 provides the data storage device read/write circuitry that controls the operation of the read/write head 118, as well as other interface and control circuitry for the disc drive 100.

Figure 2:
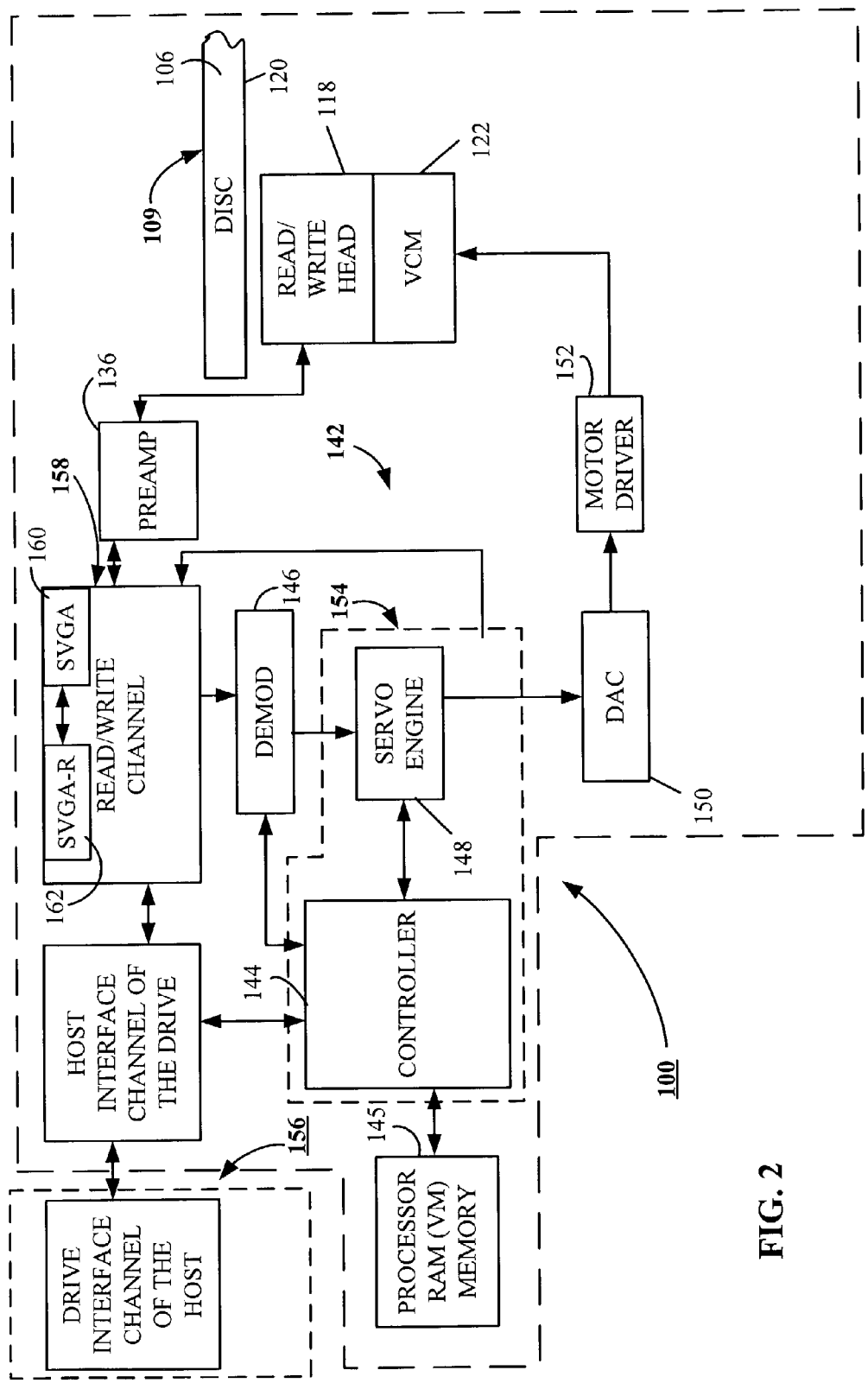
FIG. 2 is a functional block diagram of a circuit for controlling operation of the disc drive of FIG. 1 and in determining a fly height status of the read/write head of FIG. 1.

Turning to FIG. 2, position-controlling of the read/write head 118 is provided by the positioning mechanism (not separately shown) operating under the control of a servo control circuit 142 programmed with servo control code, which forms a servo control loop.

The servo control circuit 142 includes a micro-processor controller 144 (also referred to herein as controller 144), a volatile memory or random access memory (VM) 145, a demodulator (DEMOD) 146, an application specific integrated circuit (ASIC) hardware-based servo controller ("servo engine") 148, a digital to analog converter (DAC) 150 and a motor driver circuit 152. Optionally, the controller 144, the random access memory 145, and the servo engine 148 are portions of an application specific integrated circuit 154.

Typically, a portion of the random access memory 145 is used as a cache for data read from the information track 120 awaiting transfer to a host connected to the disc drive 100, and for data transferred from the host to the disc drive 100 to be written to the information track 120. The components of the servo control circuit 142 are utilized to facilitate track following algorithms for the actuator assembly 110 (of FIG. 1) and more specifically for controlling the voice coil motor 122 in position-controlling the read/write head 118 relative to the selected information track 120 (of FIG. 1).

The demodulator 146 conditions head position control information transduced from the information track 120 of the rotatable recording surface 109 to provide position information of the read/write head 118 relative to the information track 120. The servo engine 148 generates servo control loop values used by the controller 144 in generating command signals such as seek signals used by voice coil motor 122 in executing seek commands. Control loop values are also used to maintain a predetermined position of the actuator assembly 110 during data transfer operations.

The command signals generated by the controller 144 and passed by the servo engine 148 are converted by the digital to analog converter 150 to analog control signals. The analog control signals are used by the motor driver circuit 152 in position-controlling the read/write head 118 relative to the selected information track 120, during track following, and relative to the rotatable recording surface 109 during seek functions.

In addition to the servo control code program of the application specific integrated circuit 154, control code is also programmed into the application specific integrated circuit 154 for use in executing and controlling data transfer functions between a host 156 and the disc drive 100. Read/write channel electronics 158, operating under control of the controller 144 executing the control code, passes data received from the host 156 to the read/write head 118 for storage on the disc 106 and passes data read by the read/write head 118 from the disc 106 back to the host 156.

The read/write channel electronics 158 includes a servo variable gain amplifier (SVGA) 160, which amplifies an amplitude of a head position control signal read from the information track 120. The amplified amplitude of the head position control signal, provided by the servo variable gain amplifier 160, is stored in a servo variable gain amplifier register 162 for subsequent release to, and processing by, the servo engine 148.

It will be recognized that the height (distance) that a given read/write head 118 flies adjacent an associated disc surface will generally depend upon the rotational speed of the discs 106 and the particular characteristics of the head. While all of the heads 118 in a particular disc drive are designed to nominally fly at the same height for a selected rotational speed of the discs 106 (i.e., a nominal operational fly height), some amount of manufacturing variations will tend to be present in a given population of heads.

Thus, in a given disc drive 100, some heads will tend to fly at a slightly higher than nominal operational fly height while other heads will tend to fly at a slightly lower than nominal operational fly height. The lowest flying head 118 in a disc drive 100 will typically land (i.e., contact its corresponding disc surface) before the other heads 118 in the drive as the discs 106 are decelerated to rest.

A particularly low flying head can accordingly pose a long term reliability risk for the drive. Drive manufacturers have employed a number of different methodologies in an attempt to screen for low flying heads during disc drive manufacturing operations.

The present invention (as embodied herein and as claimed below) provides a novel approach to characterizing the fly height characteristics of a selected head 118. This novel approach entails an evaluation of the readback response of the head 118 reading a constant frequency pattern written to a corresponding disc while the corresponding disc decelerates from a nominal operating rotational velocity to a stationary state.

As will be recognized, an amplitude of a readback signal obtained from a selected head 118 will generally increase as the head 118 comes into closer proximity to the disc 106. It has been found that a modulation of a readback signal of a constant frequency pattern written to the disc 106 commences just prior to the head 118 landing on the disc surface. Thus, monitoring the readback response of a head to a constancy frequency pattern provides a distinct read signal landing signature that can be used to accurately determine the fly height status of the head.

Figure 3:
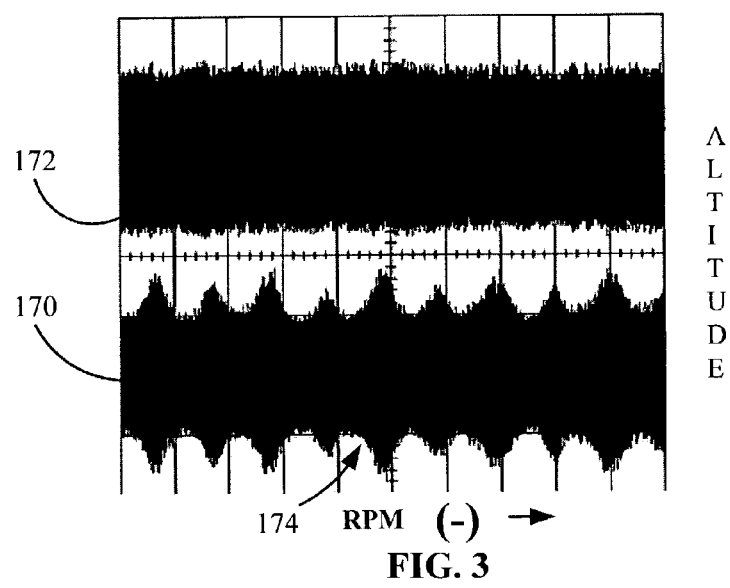
FIG. 3 is a graphical representation of a typical read signal landing signature of a constant frequency pattern written to a corresponding disc as read by the read/write head prior to landing on a disc.

FIG. 3 shows a pair of read signals 170, 172 plotted against a common elapsed time x-axis and a common signal amplitude y-axis. The signals 170, 172 are both obtained from a selected head 118 as the head transduces a constant frequency pattern from the associated disc 106, with the signal 170 obtained as the head 118 flies in close proximity to the disc surface just before contact and the signal 172 obtained as the head 118 flies at a higher fly-height.

It will be noted that the overall peak amplitudes of the respective read signals 170, 172 are reasonably similar in value. What distinguishes the typical nominal read signal 172 from the close proximity read signal 170 is the presence of characteristic amplitude modulation 174 (i.e., the peak and valley variation of the amplitude across the read signal 170). This characteristic amplitude modulation 174 provides a read signal landing signature that can be used as a reliable and repeatable indicator of the landing characteristics of the head 118.

Table 1 provides a summary of data obtained for a population of five different heads (substantially similar to the heads 118 of FIG. 1) showing the disc speeds (in disc rpm) when modulation of the amplitude of the readback signal were observed for various atmospheric conditions.

An atmospheric chamber was employed to simulate various altitudes. An increase in altitude results in a reduction in density of the available atmosphere, which reduces the amount of available lift for flying the read/write head 118 adjacent the disc 106 for any given disc speed. Less lift results in a lower fly height of read/write head 118 for any given disc speed.

Although some variations were observed in the specific disc speeds (rpms) at which the amplitude modulations occurred, the data showed a consistent trend in that higher flying heads tended to land at a lower rpm and lower flying heads tended to land at a higher rpm. By applying a threshold value suitable for the environment in which the discs 106 are rotated, heads that exhibit the amplitude modulation above said threshold value can be characterized as insufficiently low flying heads and removed from the manufacturing operation.

Figure 4:
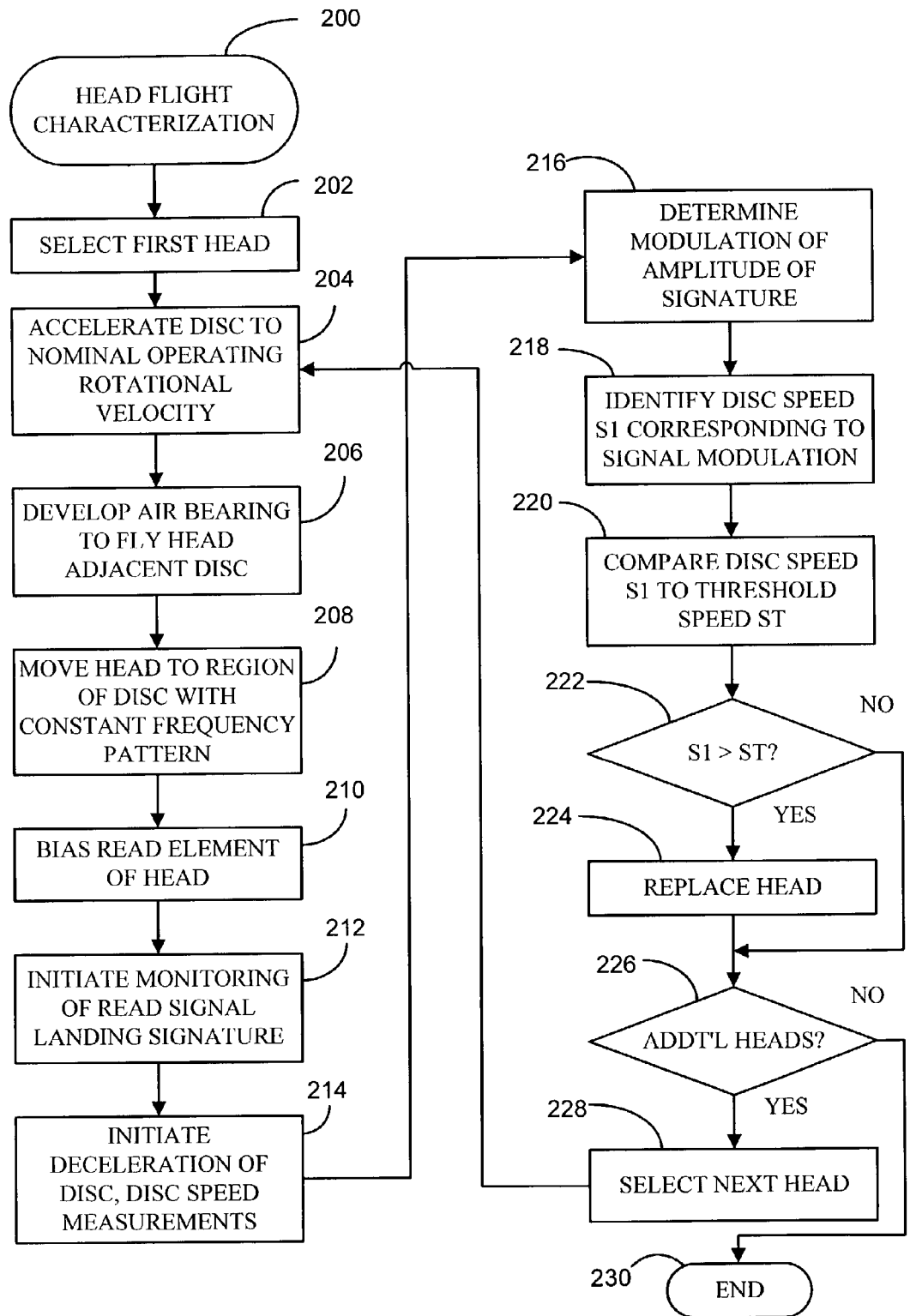
FIG. 4 is a flow chart of a characterization process for characterizing the fly height status of a read/write head of the disc drive of FIG. 1.

FIG. 4 provides a flow chart for a head flight characterization routine 200, generally illustrative of steps carried out in accordance with preferred embodiments of the present invention. The routine is preferably carried out during manufacturing using a test stand or other suitable test equipment for a population of heads (such as 118). The routine can also be carried out within the confines of a disc drive (such as 100), as desired. Additionally, the routine may be carried out in either an ambient atmospheric environment or a reduced density atmospheric environment (such as helium enriched environment).

The first head (such as 118) to be tested is selected at step 202, and the associated disc (such as 106) is accelerated at step 204 to a nominal rotational velocity. This results in the generation of an air bearing sufficient to fly the head 118 adjacent the disc surface, as indicated by step 206. The head 118 is moved at step 208 to a position adjacent a region of the disc surface to which a constant frequency pattern is written. The pattern is preferably written to a region that is inaccessible for storage of customer data. The pattern can be prerecorded (such as during a prior servo track writing operation during which the servo data are written), or the pattern can be written during the operation of step 208 as desired.

An appropriate biasing of the head 118 (such as through application of a low level read bias current) is applied at step 210 to enable the head 118 to output a readback signal in response to the constant frequency pattern written to the disc surface. Monitoring of the readback response of the head is initiated at step 212. At this point, the head 118 will generally provide a baseline response such as shown by the typical nominal read signal 172 in FIG. 3.

The disc surface is next decelerated beginning at step 214 and continuous speed measurements are obtained as the disc surface decelerates to rest. As the head 118 comes closer to the disc surface, an amplitude modulation of the typical nominal read signal 172 will be determined at step 216. This can be carried out by monitoring the output of a digital oscilloscope configured to display the readback response. The amplitude modulation can also be determined by monitoring an output response of a servo variable gain amplifier (such 160 in FIG. 2).

An associated disc speed S1 coincidental with the occurrence of the read signal landing signature is next identified at step 218 and compared to a preselected threshold value ST at step 220. As shown by decision step 222, when the disc speed S1 is greater than or equal to the threshold value ST, the head selected is determined to have unsuitably low flying characteristic and the routine 200 passes to step 224 where the head is replaced or otherwise rejected from the manufacturing operation.

On the other hand, when the disc speed S1 is less than the threshold value ST, the head is accepted for further operations. The routine then passes to decision step 226 which inquires whether additional heads remain to be tested. If so, the next head is selected at step 228 and the routine is repeated for the next selected head. Finally, when all heads have been tested in turn, the routine ends at step 230.

In an alternate embodiment, each of the plurality of disc drives (such as 100) are placed in an altitude chamber, the rotational velocity of the disc (such as 106) is maintained at the nominal operating rotational velocity and a previously written constant frequency pattern present in a recording surface (such as 109) of the disc is read while increasing the effective altitude experienced by the disc drive.

Upon encountering the read signal landing signature, the effective altitude experienced by the disc drive concurrent with the occurrence of the read signal landing signature is logged for each of the plurality of disc drives of the particular configuration being evaluated. The data are reviewed and a determination is made, taking into consideration any additional margin of safety thought appropriate, regarding an effective altitude threshold, and an effective altitude threshold is set.

In an additional alternate embodiment, an ambient atmosphere within each of the plurality of disc drives (such as 100) is displaced with a lower density atmosphere, such as helium, at a predetermined rate; rotational velocity of the disc (such as 106) is maintained at substantially the nominal operating rotational velocity; and a previously written constant frequency pattern present in the recording surface (such as 109) of the disc is read while the ambient atmosphere is displaced. Displacement of the ambient atmosphere with a lower density atmosphere decreases the fly height of the read/write head (such as 118).

Upon encountering the read signal landing signature, the rate dependent elapse time of the atmosphere displacement procedure is logged for each of the plurality of disc drives of the particular configuration being evaluated. The data are reviewed and a determination is made, taking into consideration any additional margin of safety thought appropriate, and an effective rate dependent elapsed time threshold is set.

It will be noted that the constant frequency pattern transduced during the operation of the routine of FIG. 4 preferably extends around a complete circumference of the disc surface. In such case no servo positioning data are present in the region to which the pattern is written. This will tend to prevent the servo circuit 154 from using such data to detect and correct the position of the head 118 to maintain the head over the pattern.

Thus, the region to which the constant frequency pattern is written is preferably selected so that the head 118 can be mechanically biased to remain over the pattern. For example, the pattern can be written to the landing zone 120, and current can be supplied to the voice coil motor 122 to bias the actuator 110 against the inner limit stop and maintain the head 118 over the pattern. The pattern can alternatively be written to a guard track region at the outermost diameter of the discs 108 and current can be supplied to the voice coil motor 122 to bias the actuator 110 against the outer limit stop to maintain the head 118 over the pattern.

In another preferred embodiment, the head characterization takes place in a spin-stand to sort the heads prior to installation into the disc drive 100, with the spin-stand providing suitable mechanisms to precisely maintain the head 118 in a desired relationship with the associated disc surface.

During the practice of preferred embodiments of the present invention, it will be understood that the operational rotational velocity of the disc 106 is determined by a product specification. The nominal configuration of the heads 118 is selected to accommodate a predetermined nominal fly-height during data transfer operations with the discs 106. The frequency of the constant frequency pattern can be any suitable value based on a given configuration, and in a preferred embodiment corresponds to the write frequency used to write the servo data to the discs 106.

The predetermined rotational velocity threshold used to separate low-flying heads from non low-flying heads is also empirically determined based on the drive configuration as well as other factors associated with a given application.

Accordingly, embodiments of the present invention are directed to categorization of a read/write head (such as 118) of a disc drive (such as 100) as a low-flying read/write head or a non low-flying read/write head. The categorization is based on an occurrence of a read signal landing signature (such as 170) occurring prior to an encountering of a predetermined threshold. The read signal landing signature is based on a readback of a constant frequency pattern previously written to a recording surface (such as 109) typically located within a region of the disc inaccessible for storage of customer data.

The readback of the previously written constant frequency pattern present in the recording surface occurs while a disc (such as 106) decelerates from a nominal operating rotational velocity to a stationary state during a landing procedure.

Figure 5:
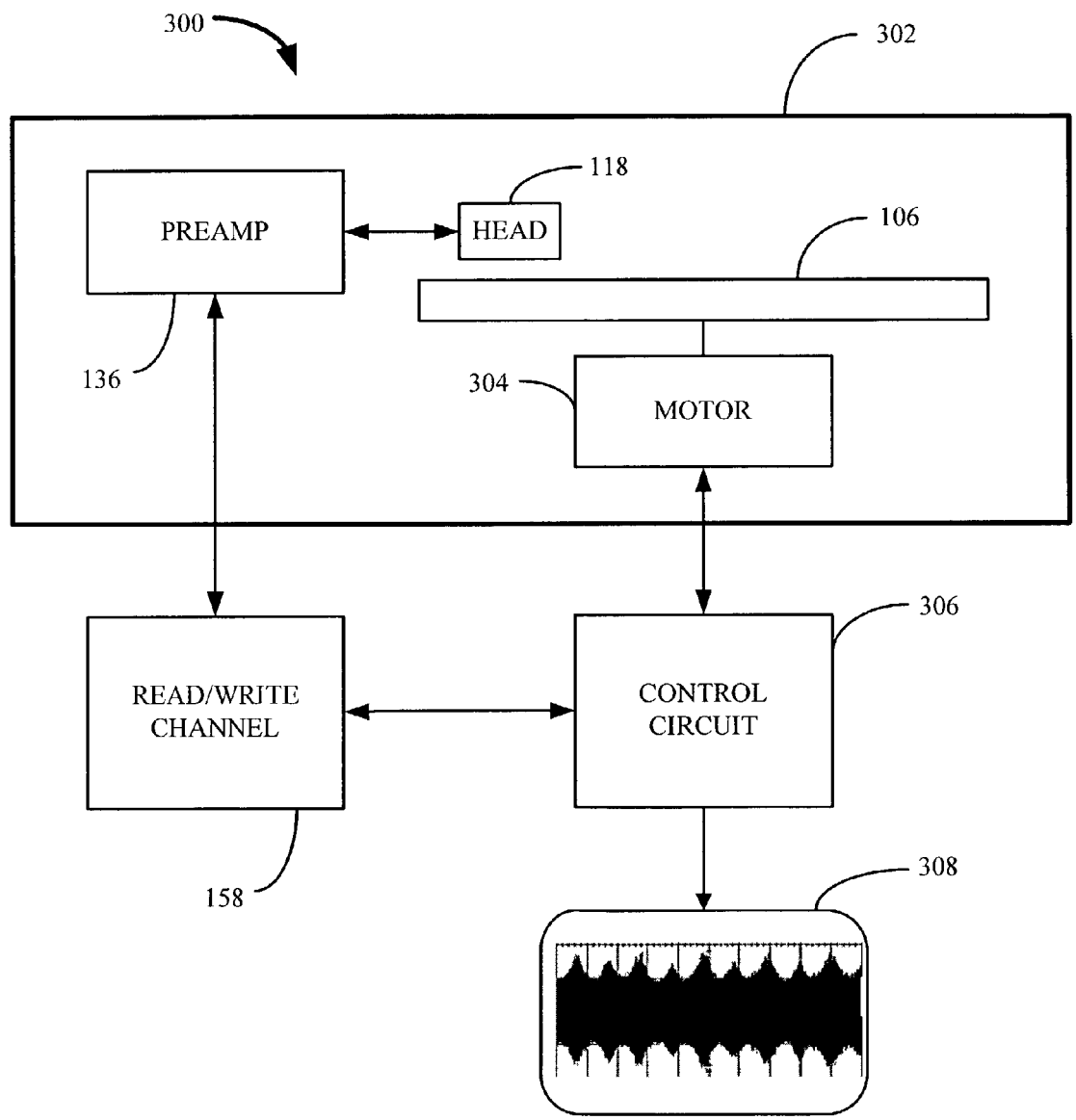
FIG. 5 provides a functional block diagram of a system configured to carry out the routine of FIG. 4 in accordance with preferred embodiments of the present invention.

FIG. 5 provides a system 300 configured to carry out the routine of FIG. 4 in accordance with preferred embodiments of the present invention. The system 300 includes several components discussed above including the disc 106, head 118, preamp 136 and read/write channel 158 shown in FIG. 2. The system further preferably includes a housing 302 in which at least the head 118 and the disc 106 are disposed, a motor 304 used to rotate the disc 106 at a desired rotational speed, a control circuit 306 which provides overall control of the system 300, and an analysis and display module 308.

In a preferred embodiment, the system 300 is incorporated into a spin-stand in which multiple discs 106 and heads 118 are supported. In such case the heads 118 are preferably evaluated as part of a servo track writing operation in which the aforementioned servo information is written to the disc surfaces 109. The control circuit 306 in this configuration can comprise a host computer alone or in conjunction with selected circuitry from FIG. 2 can be configured to carry out the routine of FIG. 4. The module 308 can comprise a monitor of the computer or a separate data acquisition device (such as a digital oscilloscope).

In an alternative embodiment, the system 300 is embodied within the disc drive 100 so that the housing 302 corresponds to the housing formed by the base deck 102 and top cover 103, the motor 304 corresponds to the spindle motor 104 (FIG. 1) and the control circuit 306 corresponds to the controller 144 (FIG. 2).

The module 308 can comprise a separate data acquisition device (such as a digital oscilloscope) with test probes placed in electrical communication with appropriate test points on the disc drive printed circuit board assembly to obtain data as shown in FIG. 3. The display module 306 can also be incorporated into the circuitry of FIG. 2 such as by using suitable programming of the controller 144 so that the signature is detected in relation to baseline and peak values from the readback signals obtained from the head 118.

Accordingly, embodiments of the present invention are generally directed to categorization of a read/write head (such as 118) of a disc drive (such as 100) as a low-flying read/write head or a non low-flying read/write head. The categorization is based on an occurrence of a read signal landing signature (such as 170) occurring prior to an encountering of a predetermined threshold. The read signal landing signature is based on a readback of a constant frequency pattern written to a recording surface (such as 109) located within a region of the disc inaccessible for storage of customer data. The readback of the constant frequency pattern present in the recording surface preferably occurs while a disc (such as 106) decelerates from a nominal operating rotational velocity to a stationary state during a landing procedure.

For purposes of the appended claims, it will be understood that the disclosed structure corresponding to the recited first means comprises the circuitry shown in FIG. 5.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising:
    supporting a transducer at a fly height adjacent a data storage medium by a predetermined force resulting from a first state of a fluid surrounding the transducer;
    retrieving output data from the data storage medium;
    altering a condition affecting the fluid by replacing the fluid with a different fluid having a different density to reduce the force until the output data indicates a response that is characteristic of a minimum noncontacting fly height at a second state of the fluid; and
    comparing the altered condition associated with the fluid second state with a predetermined threshold to determine the transducer fly height performance.

2. The method of claim 1 wherein the condition is characterized by a dynamic fluid pressure that is proportional to data storage medium velocity.

3. The method of claim 1, further comprising storing input data associated with the output data before the retrieving step.

4. The method of claim 3, wherein the storing step comprises storing a constant frequency data pattern.

5. The method of claim 1, wherein the condition is characterized by a static fluid pressure in relation to atmospheric pressure.

6. The method of claim 4 wherein the response is characterized by an amplitude modulation.

7. A system comprising:
    a transducer adapted for a data storing and retrieving relationship with a data storage medium; and
    means for determining fly height performance of the transducer by associating an observed occurrence of a characteristic output data signature response with an expected occurrence.

8. The system of claim 7, wherein the means for determining is characterized by observing an amplitude modulation of the output data.

9. The system of claim 7, wherein the means for determining is characterized by observing a gain oscillation of the output data.

10. The system of claim 7, wherein the means for determining is characterized by storing input data associated with the output data with the transducer.

11. The system of claim 7, wherein the means for determining is characterized by changing a velocity of the data storage medium.

12. The system of claim 7, wherein the means for determining is characterized by changing a static pressure of a fluid aerodynamically supporting the transducer.

13. The system of claim 7, wherein the means for determining is characterized by changing a density of a fluid supporting the transducer.

* * * * *